United States Patent [19]
Breipohl et al.

[11] Patent Number: 6,116,703
[45] Date of Patent: Sep. 12, 2000

[54] PROCESS FOR THE BRAKING OF A VEHICLE

[75] Inventors: Hans-Jörg Breipohl, Hannover; Helmut Pannbacker, Hemmingen; Thomas Wolf, Hannover, all of Germany

[73] Assignee: WABCO GmbH, Hannover, Germany

[21] Appl. No.: 09/081,325

[22] Filed: May 19, 1998

[30] Foreign Application Priority Data

Jun. 4, 1997 [DE] Germany .............. 197 23 323

[51] Int. Cl.⁷ .................. B60T 8/64; B60T 8/32
[52] U.S. Cl. ............................ 303/148; 303/149
[58] Field of Search ................... 303/146, 148, 303/149, 163, 169, 170; 188/181 C

[56] References Cited

U.S. PATENT DOCUMENTS

| | | | |
|---|---|---|---|
| 4,313,166 | 1/1982 | Rode et al. | 364/426 |
| 4,925,254 | 5/1990 | Holst et al. | 303/111 |
| 5,224,766 | 7/1993 | Oikawa et al. | 303/148 |
| 5,407,258 | 4/1995 | Giers et al. | 303/148 |
| 5,498,071 | 3/1996 | Oikawa et al. | 303/149 |
| 5,518,308 | 5/1996 | Sugawara | 303/169 |
| 5,520,448 | 5/1996 | Okubo | 303/148 |
| 5,688,029 | 11/1997 | Bach et al. | 303/139 |
| 5,809,444 | 9/1998 | Hadeler et al. | 701/72 |
| 5,913,576 | 6/1999 | Naito et al. | 303/112 |
| 5,934,769 | 8/1999 | Brachert et al. | 303/146 |
| 5,934,770 | 8/1999 | Okazaki | 303/150 |

FOREIGN PATENT DOCUMENTS

| | | |
|---|---|---|
| 0 307 588 A2 | 3/1989 | European Pat. Off. . |
| 0 226 077 | 6/1990 | European Pat. Off. . |
| 36 39 864 A1 | 6/1987 | Germany . |
| 28 51 107 C3 | 3/1990 | Germany . |
| 44 10 937 C1 | 8/1995 | Germany . |
| 2 307 526 | 5/1997 | United Kingdom . |

*Primary Examiner*—Chris Schwartz
*Attorney, Agent, or Firm*—Proskauer Rose LLP

[57] ABSTRACT

A process for the braking of a vehicle on road surfaces with varying frictional values influences the respective braking forces on the wheels of at least one axle via a common braking value. The inventive process recognizes differences between these frictional values, and the common braking value is adjusted so that the wheel located on the surface with the lower frictional value is locked at least intermittently, while the frictional value of the other wheel can be utilized advantageously. The common braking value is reduced at predetermined time intervals, so that the wheel located on the surface with the lower frictional value can start up again from the locked state when an increase in frictional value occurs. Depending on the reaction of the wheel located on the surface with the lower frictional value, it is then possible to decide whether further locking of this wheel is acceptable, or must be terminated because of anticipated damage to the tire, or reduction of travel stability.

16 Claims, 2 Drawing Sheets

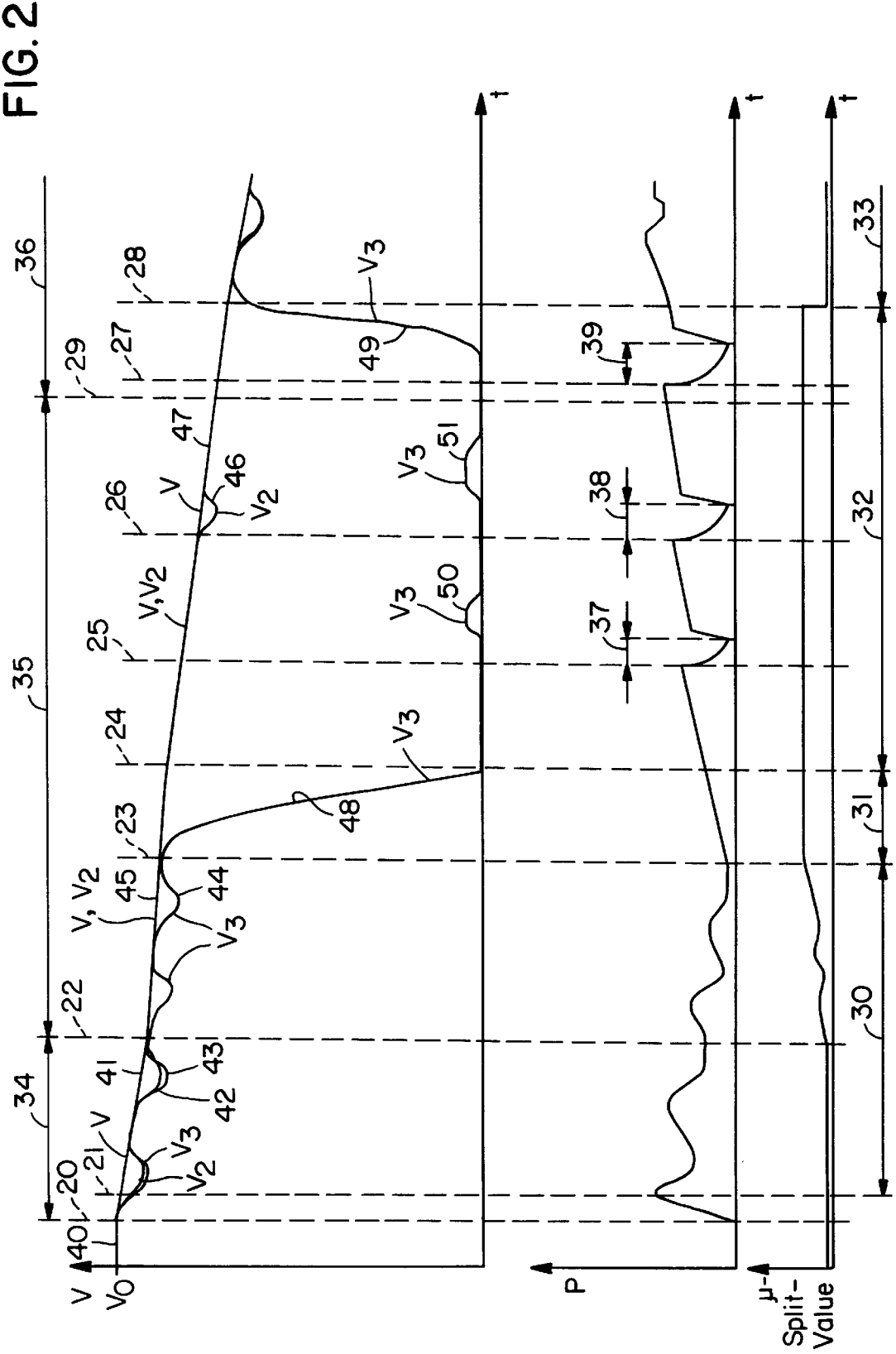

PROCESS FOR THE BRAKING OF A VEHICLE

FIELD OF THE INVENTION

The present invention relates to a process for the braking of a vehicle in which the braking forces applied to the wheels of at least one axle can be influenced by a common braking value, in particular a common braking pressure, on road surfaces with changing frictional values.

BACKGROUND OF THE INVENTION

In the following explanations, any magnitude in a braking system by which the braking forces on the vehicle wheels can be influenced is understood to be a "braking value."

The "slip" of a wheel subjected to braking force is defined as the difference between the vehicle velocity and the rotational velocity of that wheel. The percentile vehicle velocity-share of the previously described slip is understood to be the "relative slip."

The locking of a wheel is understood to be a state in which the relative slip reaches a value of nearly 100%. At lower slip values, only a locking tendency exists.

A braking process of the kind described above is known from DE 44 10 937 C1. Braking processes of this type are generally used in combination with pressure-fluid actuated braking systems equipped with an anti-lock braking system (ABS). They can also be used in electronically controlled braking systems (EBS). To ascertain the rotational velocities of the vehicle wheels, sensors are used, and so-called pressure modulators are used to adjust the braking forces on the vehicle wheels. Vehicle wheels equipped with such sensors are called sensed wheels hereinafter. Solenoid valves, for example, are used as pressure modulators. The braking forces are determined on the basis of a signal which is hereinafter called a braking value. Any magnitude in the braking system which influences the braking forces can be used as a braking value. In a conventional braking system, the braking pressure influenced by the pressure modulator is normally used as the braking value. In an electronically controlled braking system, an electrical signal can also be used as a braking value.

When the vehicle is braked, locking of one or several wheels may occur, and this should be prevented by the anti-lock braking system (ABS), or by the electronic braking system (EBS). For this purpose, a control device evaluates the rotational velocity signals of the sensed wheels, and influences the braking forces at the wheels by means of the braking value.

For reasons of cost, each wheel on a vehicle axis is not equipped with a pressure modulator in certain vehicle models, e.g., in small trucks, but all the wheels of an axle are controlled with one single pressure modulator. When such a vehicle is braked on a road surface on which the frictional values (also called adhesion coefficients in the literature) are different on the two sides of the vehicle, the problem occurs that the wheels on both vehicle sides must be subjected to braking forces for optimal utilization of frictional values, but this is not possible on a vehicle axle with only one pressure modulator. On such a vehicle axle, the braking forces can only be adjusted together via one single braking value, for the determination of which a suitable regulating principle is necessary.

It is a known method to tie the rotational velocity signals of the wheels of that axle, or the regulating signals derived therefrom, into one single guiding magnitude, and to determine the braking value on the basis of this guiding magnitude. A process in general use consists of using the signals of the wheel located on the lower frictional value (low wheel) as the guiding magnitude (select low regulation). In this case, the maximum braking force of the wheel located on the surface with the higher frictional value (high wheel) transmissible to the road surface is not utilized, so that a relatively long braking distance results.

In the opposite case, it can also be seen that the signals of the wheel located on the surface with the higher frictional value may be used as guiding magnitude (select high regulation). In this manner, a relatively short braking distance is achieved, but with locking of the wheel located on the surface with the lower frictional value. This involves the danger that the tire may be damaged on the locking wheel, in particular if the lower frictional value increases again during the locking phase.

In the process for the braking of a vehicle mentioned initially, the proposal is made that when braking on a road surface with different frictional values on the two vehicle sides, the braking pressure be raised rapidly at first to a first value, and then be slowly raised to a pressure limit value, whereupon a select high regulation is carried out. Thanks to the slow increase of the braking pressure, a slow increase of the yawing moment or of steering forces is to be achieved. The select high regulation, by which the wheel located on the surface with the lower frictional value locks constantly, is maintained until full stop of the vehicle, or cessation of braking.

The above-described regulating concept has the disadvantage that as the originally low frictional value increases to a higher value during the select high regulation, the locking wheel often fails to start up again, so that the tire is damaged. Because the wheel locks constantly, it is also not possible to recognize such frictional value changes based on its rotational velocity signal.

It is therefore an object of the present invention to propose a process for the braking of a vehicle in which the braking forces applied to the wheels of an axle can be influenced by a common braking value at least at one axle, on road surfaces with changing frictional values, so that a short braking distance is achieved, and whereby frictional value changes can be detected at any time, in particular on a wheel which is located at first on a low frictional value.

It is a further object of the invention, that when braking on a road surface with different frictional values on the two sides of the vehicle, even a slight increase of the lower of the two frictional values is quickly detected. As a result, it is also possible to decide rapidly whether a continuation of the regulating principle used in that case, by which the wheel on the surface with the lower frictional value is locked at least intermittently, is acceptable, or whether a different regulating principle, by which the blocking of the wheel is avoided, must be applied henceforth because of expected tire damage.

Such a measure is based on recognition of the fact that a locked wheel utilizes only a relatively small portion of the available frictional value which results from the actual road surface condition. Since the locking of a wheel occurs when the braking force exerted by the braking system upon the wheel exceeds for a certain minimum time span the applicable frictional force, which is the utilized share of the available frictional value, the state of locking can be terminated correspondingly only when the utilized share of the frictional value in this state is able to provoke a frictional force which exceeds the braking force.

The above-mentioned condition can be met in principle when the locking wheel reaches a road surface segment on which the available frictional value is considerably greater, so that a sufficiently high frictional force is produced, in spite of the low utilization of frictional value during locking. In this case, the wheel starts up again without additional measures. No noticeable damage to the tire occurs.

In many instances however, the available frictional value will not suddenly increase to a considerably higher value, but will increase either slowly, or only slightly, so that the frictional force then produced by the utilized share of the frictional value is not yet sufficient to exceed the braking force. In this case, it may already be possible for the tire to become damaged.

Through the reduction of the braking forces at certain time intervals according to the invention, the conditions for a cessation of wheel locking can be met, however, during the time intervals, so that even in case of a slight increase of the available frictional value, the wheel is able to start up again after a short period of time, and can possibly be driven on with another regulating principle. In this manner, damage to the tires can be avoided.

It is another object of the invention to provide a second regulating principle in addition to the first regulating principle, where a wheel may lock for road surfaces with greatly different frictional values, said second regulating principle being preferably used on road surfaces with frictional values that are nearly equal on both sides, or which differ only slightly from each other, and where none of the wheels locks. Thereby, the lateral guiding force of the wheels is increased, and thus the travel stability of the vehicle during braking in a curve is improved. In this manner, an especially flexible type of brake force control can be achieved with many frictional value combinations occurring in practice.

It is still another object of the invention that the first regulating principle is not generally stopped when the lower frictional value increases, but that, depending on the magnitude of the increase which can be derived from the rotational velocity signals each time after a reduction of the braking forces according to the invention, a decision is made under which regulating principle travel is to be continued, while taking into consideration possible tire damage and the braking distance. As a result, an especially high level of safety is attained.

Yet another object of the invention is that the inventive process be used as part of a superimposed regulating concept in which different individual regulating principles are provided for different road surface conditions. An evaluation of the difference between the frictional values on the sides of the vehicle is provided for the selection of the required regulating principle in each case. For this, the rotational velocity signals are determined on both sides of the vehicle during braking by means of an integration over time, and from the difference of the time integrals, a "$\mu$-split-value" is determined, which indicates the difference between the frictional values on the two sides of the vehicle. A suitable process for this is described in further detail in the prior art, e.g., in DE 44 10 937 C1, which is incorporated herein by reference.

In addition to the regulating principles already mentioned, an additional regulating principle may be provided which is used preferably on road surfaces with frictional values that are almost identical on both sides, or are only slightly different from each other, and where none of the wheels locks. The additional regulating principle may be identical with the second regulating principle.

SUMMARY OF THE INVENTION

In accordance with an illustrative embodiment of the present invention, the inventive process is as follows:

a) the rotational velocities are measured as rotational velocity signals on at least two sensed wheels of an axle and located on different sides of the vehicle;

b) through evaluation of the changes over time of the rotational velocity signals, a verification is made as to whether the sensed wheels show a locking tendency during braking of the vehicle;

c) through evaluation of the changes over time of the rotational velocity signals during braking of the vehicle, a difference between the frictional values existing between the road surface and a sensed wheel is determined as a $\mu$-split-value, insofar as none of the sensed wheels locks;

d) if a locking tendency has been ascertained on the sensed wheels, and the $\mu$-split-value does not exceed a predetermined limit value, the braking value is influenced in such manner that none of the sensed wheels locks with the highest possible brake forces;

e) if a locking tendency has been ascertained on the sensed wheels, and if the $\mu$-split-value furthermore exceeds the predetermined limit value, the braking value is influenced in such manner within the framework of the first regulating principle that only the wheel located on the surface with the lower frictional value locks at least intermittently;

f) during the first regulating principle, the braking forces are briefly reduced by influencing the braking value during predetermined time intervals to such an extent that the wheel located on the surface with the lower frictional value is able to go from the locked state to start-up again, if an increase of the frictional value has intervened in the meantime;

g) if the rotational velocity signal of the wheel on the surface with the lower frictional value increases to the approximate level of the rotational velocity signal of the wheel on the greater frictional value, in particular as a result of a reduction of braking forces, the first regulating principle is terminated, and the braking value is again influenced in such manner that none of the sensed wheels is locked;

h) if the rotational velocity signal of the wheel on the surface with the lower frictional value does not increase to the approximate level of the rotational velocity signal of the wheel on the surface with the higher frictional value, the braking value is again influenced in such manner under the first regulating principle that only the wheel on the surface with the lower frictional value is locked at least intermittently.

As a result of the above, a short braking distance can be achieved on road surfaces with changing frictional values without damage to the vehicle tires as a result of locking.

The present invention is used advantageously in braking systems where an increase of the braking value causes an increase of the braking forces, and where a decrease of the braking value causes a decrease of the braking forces. In this case, for instance, a proportional correlation can exist between the magnitudes of braking value and braking force. The invention is not limited, however, to such applications.

In an advantageous further development of the present invention, the principle of select low regulation is used as the second and/or additional regulating principle. This has the advantage that during this period a regulation can be carried out very easily and with little effort.

In another advantageous development of the present invention, the principle of the modified axle regulation according to DE 37 33 801 A1 (U.S. Pat. No. 4,925,254, which is incorporated herein by reference), is used as a second and/or additional regulating principle. As a result, a shorter braking distance is obtained with only slightly greater effort than with the select low principle.

In an advantageous further development of the present invention, and under the first regulating principle, the braking forces are increased through influence of the braking value to such extent outside the time period during which the braking forces are briefly decreased, so that the wheel on the surface with the higher frictional value shows a locking tendency. As a result, a very short braking distance can be achieved since the available (higher) frictional value is utilized as much as possible. Because the braking forces are briefly decreased at predetermined time intervals during the first regulating principle, the braking forces are adapted to the applicable required value through adaptive influence of the braking value outside of the time interval, for the purpose of maximum utilization of the frictional value. In this case, the braking forces can be increased continuously, or in steps, until a locking tendency of the wheel on the surface with the higher frictional value becomes apparent.

To recognize the locking tendency, and in the sense of the select high principle, the corresponding regulating signals of conventional ABS systems, e.g., negative acceleration signals (−b) and/or slip signals ($\lambda$), derived from the rotational velocity signals of the wheels, can be used. In an advantageous further development, and at variance with the select high principle, positive acceleration signals (+b) are taken into account in addition by the wheel on the surface with the lower frictional value, as regulating signals for the adjustment of the required braking value. The signals are taken into account in the manner of known regulating processes in ABS systems (see, e.g., U.S. Pat. No. 4,925,254).

A further, especially advantageous possibility for the recognition of a locking tendency during the first regulating principle consists in calculating first the mean value of the rotational velocity signals, and then monitoring them for non-attainment of a threshold value. Since the wheel on the surface with the lower frictional value is locked in the phases (time periods) to be monitored during the first regulating principle, it contributes nothing to the mean value. The mean value is therefore essentially proportional to the rotational velocity signal of the wheel on the surface with the higher frictional value. Thereby, a very easy and reliable recognition of the locking tendency is possible. Furthermore, a regulation with especially low amplitudes of the regulating fluctuations can be achieved on the wheel located on the surface with the higher frictional value, on which the available frictional value should be utilized as much as possible by means of the first regulating principle. As a result, good regulating comfort and an especially high level of frictional value utilization is achieved.

In another advantageous development, the previously mentioned threshold value is reduced when the vehicle deceleration has a very high or a very low value. Thereby, travel stability is increased on road surface segments with low frictional values on which only little vehicle deceleration can be achieved. On road surface segments with high frictional values, on which a high degree of vehicle deceleration can be achieved, the wear on tires is thereby reduced without increasing the braking distance significantly.

In another advantageous development, the braking value is changed continuously, or in small steps, during the transition to the first regulating principle following a time function. Through the selection of a suitable time function, a steady, slow transition between the, types of regulation can be achieved. As a result, a sudden increase of the yaw moment and of the steering forces can be avoided, and thereby, a vehicle behavior that would be surprising for the driver can also be avoided.

In another advantageous development of the invention, a transition to the first regulating principle takes place only with vehicle decelerations which are below a predetermined limit value. Since relatively rapid vehicle decelerations, even where the frictional values on the two vehicle sides are different, are an indication that even the lower frictional value is of a magnitude which would lead to tire damage in case of a locked wheel, the first regulating principle is not applied in such cases. Instead, travel is continued under the regulating principle applied up to then. Here too, a sufficient vehicle deceleration is achieved while avoiding damage to the tires.

In an advantageous further development of the invention, the braking value applicable before a time interval, during which the braking forces had been reduced briefly under the influence of the braking value, is adopted again, at least approximately, during the first regulating principle after the time interval. As a result, the required braking force can again be restored very rapidly after the reduction of braking force, and thus a short braking distance can be achieved. When using the invention in a steered vehicle axle, this further development also eliminates uncomfortable jolts in the steering mechanism to a large degree.

An illustrative embodiment of the present invention is more fully described below in conjunction with the following drawings.

BRIEF DESCRIPTION OF THE DRAWINGS

FIG. 2 shows the changes over time in time of different signals within the braking system when the vehicle is braked, in accordance with the invention.

The same reference numbers are used in the figures for the same parts and signals.

DETAILED DESCRIPTION OF THE INVENTION

Figure 1:
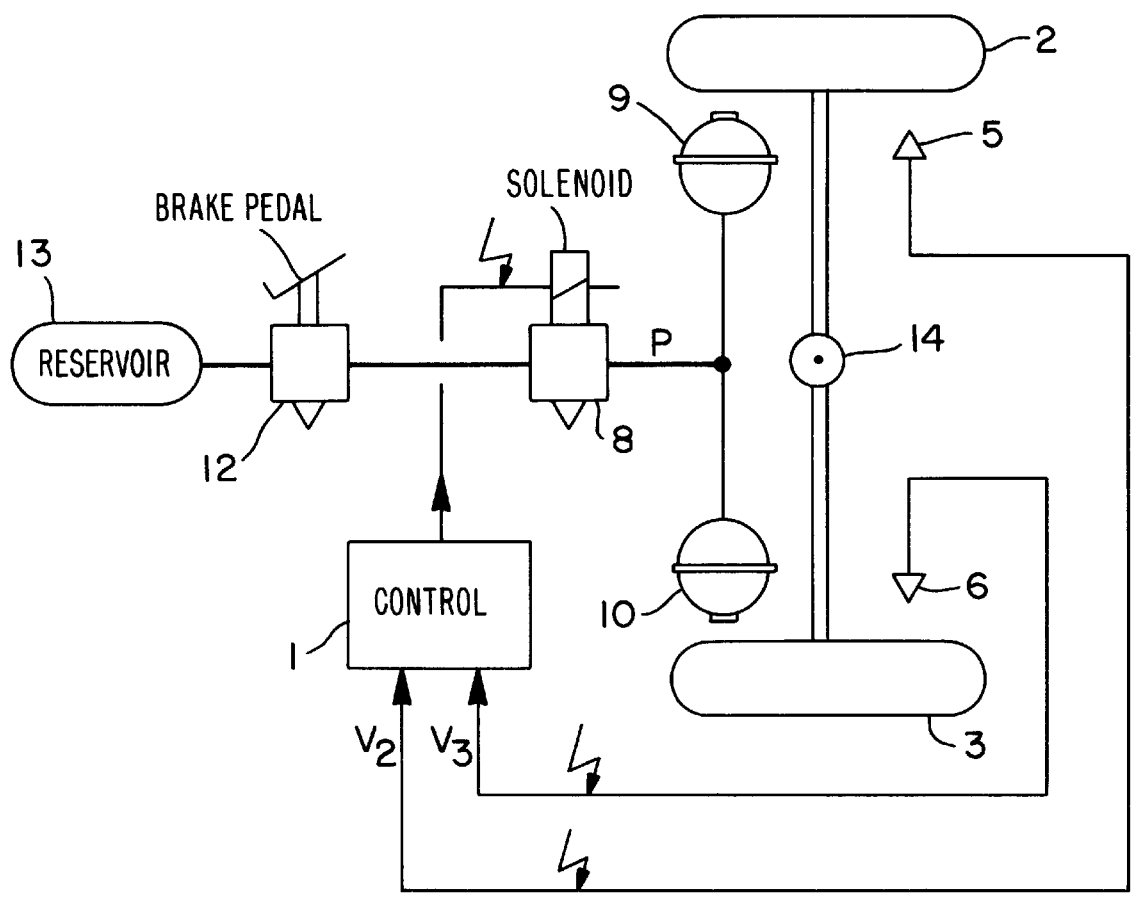
FIG. 1 shows the parts of a vehicle braking system according to the invention.

The parts of a vehicle braking system according to the invention are shown in FIG. 1. A vehicle axle (14) is shown to which two wheels (2, 3) are attached. The wheels are provided with tires which are not shown, and which establish the contact between the vehicle and the road surface. Each of the wheels (2, 3) is assigned a braking device (9, 10), by means of which the wheels can be subjected to braking forces. The braking devices (9, 10) can be made in the usual manner in the form of compressed-fluid actuated drum or disk brakes. For actuation, the braking device (9, 10) can be subjected via valves (8, 12) to a pressure medium which is taken from a pressure medium reservoir (13). Additional components needed for the operation of such a pressure-medium actuated braking system, such as, e.g., a compressor to fill the pressure medium reservoir (13), are not shown in FIG. 1.

On the one hand, subjecting the braking device (9, 10) to the pressure medium can be controlled by the driver through actuation of the brake valve pedal (12). On the other hand, the braking pressure generated by the brake valve pedal (12) can be further influenced by the solenoid valve (8), connected in series with the brake valve pedal (12).

In the embodiment of the example, the outlet pressure (P) of the solenoid valve (8) is used as the common braking value. The solenoid valve (8) serves here as a braking pressure modulator. It is designed to transmit the pressure appearing at its input connection and generated by the brake valve pedal (12) at a reduced, or at the most identical, level to its output connection or to the braking device (9, 10). The solenoid valve (8) can be made in the conventional manner in the form of a 3/2 directional control valve.

The solenoid valve (8) is actuated by an electrical signal which is produced by an electronic control device (1). The electrical signal may be a simple ON/OFF signal. However, it may also be a serial data signal, insofar as the solenoid valve (8) disposes of a corresponding evaluation possibility for such a signal.

The control device (1) contains a microprocessor to carry out the process according to the invention. The process according to the invention is then designed as part of the control program of the microprocessor. The rotational signals of the wheels (2, 3), which are necessary to carry out the process, are transmitted to the control device (1) in the form of input signals, which are detected by means of rotational velocity sensors (5, 6). Furthermore, a pressure sensor for the sensing of the pressure (P) transmitted by the solenoid valve (8) and not shown in FIG. 1, may also be present, its signal then also being transmitted to the control device (1) as an input signal.

If for reasons of economy, for example, no pressure sensor is used, the association between the electrical signal for the actuation of the solenoid valve (8) and the desired pressure (P) is computed in the control device, e.g., by using the data tables stored in the control device. The data tables are then determined by tests and are vehicle-specific.

The braking process according to the invention is explained below in further detail, with the help of FIG. 2, through a typical changes over time of the signals used in the control device.

In the representation of FIG. 2, the physically different magnitudes are entered in their own diagrams which are in timely correlation with each other. The velocity signals (V2, V3) of the wheels (2, 3), as well as the vehicle velocity (V), are shown in the upper diagram. Here, these signals can have the same value at times, so that three separate curves are not always visible. In case of deviations among these signals, the corresponding curves are given references insofar as this is required to understand the invention. The changes over time of the pressure (P) and that of the $\mu$-split-value, which is present only internally in the control device, are shown in the middle and bottom diagrams, respectively, in FIG. 2.

To begin with, a fictitious starting state is assumed, in which the vehicle is already traveling at a beginning velocity (V0), and is braked at a point in time (20). In this case, a nearly homogenous distribution of the frictional values is assumed at first to exist up to point in time (22). From this point in time onward, a greater difference between the frictional values on the two vehicle sides is assumed. It is, however, also possible that braking begins on a road surface segment with different frictional values. In this case, the changes over time of the process according to the invention is analogous to the representation in FIG. 2, but without the phase (34) between the points in time (21, 22).

Before the point in time (20), the vehicle travels at a beginning velocity (V0). The vehicle is neither accelerated nor braked here, so that the vehicle velocity (V) and the rotational velocity signals (V2, V3) have the same value, which is indicated by line (40). At the point in time (20), the driver initiates the braking of the vehicle by actuating the brake valve pedal (12). The braking pressure (P) then rises in time with a gradient that is vehicle-specific. At the same time, the rotational velocities (V2, V3) of the wheels (2, 3) decrease more rapidly than the vehicle velocity (V), and brake slip occurs. The rotational velocity signals (V2, V3) are continuously evaluated in the control device (1). At the point in time (21), based on the changes over time of the rotational velocities (V2, V3), a locking tendency is detected on the sensed wheels in that the brake slip ($\lambda$), or a deceleration value (–b) derived from it, exceeds a predetermined threshold. As a result, the braking pressure (P) is influenced within the framework of a modified axle regulation in accordance with DE 37 33 801 A1 (U.S. Pat. No. 4,925,254).

In this case, the control device (1) transmits electrical signals to the solenoid valve (8) in such manner that none of the wheels is locked at the highest possible braking forces. The changes over time of the braking pressure (P), as represented in phase (34), is produced. Since a nearly uniform distribution of frictional values between the two sides of the vehicle is assumed in phase (34), the velocity changes over times (42, 43) of the sensed wheels are also nearly identical in this phase. The vehicle velocity is reduced in this phase in accordance with curve (41).

At point in time (22), it is assumed that the available frictional value decreases considerably on one side of the vehicle, while the available frictional value on the other vehicle side is equal to the previously assumed value. This distribution of frictional values exists during the entire phase (35), i.e., until point in time (29). After the point in time (22), travel continues first with the modified axle regulation. Because of the changed frictional value conditions, the rotational velocity signal (V2) of the wheel (2), which in this case is on the surface with the greater frictional value, is on the same level as the vehicle velocity (V). This is represented by line (45). The wheel (3) on the surface with the lower frictional value continues to have braking slip, as shown by line (44). The changes over time of the braking pressure (P) between the points in time (22, 23) is substantially influenced by this rotational velocity signal (V3).

Through the evaluation of the changes over time of the rotational velocity signals (V2, V3), a $\mu$-split-value is determined in this phase, which then exceeds a predetermined limit value at point in time (23). As a result, and in deviation from the modified axle regulation in phase (30), the transition to the first regulating principle is now initiated. This transition is carried out in phase (31) through steady increase of the braking pressure (P) under a predetermined time function. This increase in braking pressure (P) causes the rotational velocity signal (V3) to be reduced, as shown by line (48), until the wheel (3) becomes locked at point in time (24), and the rotational velocity signal (V3) accordingly has a value of nearly zero. Starting at point in time (24), an adaptation of the braking pressure (P) takes place in accordance with the inventive characteristics of the first regulating principle, which is carried out during phase (32) and ends at, point in time (28).

The steady rise in pressure during phase (31) also causes a steady rise of the yaw moment, and thus makes it possible to achieve a controllable travel behavior of the vehicle.

During the first regulating principle, the braking pressure (P), which was at first increased steadily during the transition phase (31), continues to be increased. Here, a braking pressure level can be attained, where the wheel (2) located on the surface with the higher frictional value has a locking tendency if no brief braking pressure reduction according to the invention takes place. The wheel (3) located on the surface with the lower frictional value becomes completely blocked.

At the end of a given period of time following the beginning of the first regulating principle, i.e., following point in time (24), the braking pressure is briefly reduced. Such a braking pressure reduction is effected at the points in time (25, 27) and is, e.g., triggered by a time monitoring function. The time monitoring function can be made in the form of a counter with a fixed counting period, which triggers a braking pressure reduction at the end of each counting period, and starts counting again at the end of the braking pressure reduction. Typically, 400 ms is a suitable value for the counting period.

The duration of the brief braking pressure reduction depends on the type of braking system, the last set braking pressure level, and other vehicle-specific magnitudes (e.g., the axle loads), and can be adapted to the current application through tests. A suitable value is around 100 ms. The adaptation can also be effected automatically by the control device, in which the duration of the braking pressure reduction is calculated on the basis of the last set braking pressure level, while taking into account the previously mentioned influence magnitudes, which have then been stored in the control device in the form of parameters.

At point in time (26), the braking force on the wheel (2) located on the surface with the higher frictional value reaches a value leading to a locking tendency of this wheel, as a result of the increase in braking pressure (P) outside the time interval (37, 38, 39). At the same time, the rotational velocity signal ($V_2$) decreases as shown by line (46). The reduction of the braking pressure at point in time (26) is therefore not triggered by the time monitoring function, but by the changes over time of the rotational velocity signal ($V_2$).

As a result of the braking force reduction at the points in time (25, 26, 27), the wheel (3) located on the surface with the lower frictional value starts up again, but is locked again by the rapid braking pressure rise which occurs shortly thereafter, if the frictional value available there has not increased substantially. This behavior is shown through lines (50, 51).in FIG. 2.

Starting at point in time (29), the lower frictional value increases again to the value existing during phase (34), so that a nearly homogenous distribution of frictional values with the same frictional values as in phase (34) exists again in phase (36). The braking force reduction triggered at point in time (27), i.e., after the point in time (29), causes the wheel (3) on the surface with the lower frictional value to start up again, and this is represented by line (49). In spite of the then occurring rise in braking forces after the time interval (39), the rotational velocity of the wheel (3) continues to increase, and finally approaches the velocity of the vehicle. This behavior is already recognized at point in time (28), so that the braking pressure (P) can then be changed for further braking in phase (33), according to the modified axle regulation. However, a different regulating principle in which tire damage is avoided, e.g., select-low, can also be used.

Also at the point in time (28), the $\mu$-split-value is reset to a starting value, since it had not been taken into further account in the phases (31, 32), and was therefore kept at its last value.

As can furthermore be recognized in FIG. 2, greater vehicle deceleration is achieved through the first regulating principle than by using the modified axle regulation between the points in time (22, 23), with correspondingly high frictional value differences on both vehicle sides. Thereby, a short braking distance can be achieved on such road segments.

At the end of every time interval (37, 38, 39), in which the braking pressure (P) was at first decreased, the braking pressure is then rapidly raised back to a relatively higher level. This level is approximately equal to the braking pressure level before the time interval, but may also be selected at a somewhat lower level for safety reasons.

When the valve (8) is made in the form of a switchable valve, with the switching states "lower pressure," "hold pressure," and "raise pressure," the period of the switching state "lower pressure" is determined for the restoration of the braking pressure level, and is stored in the control device (1). The duration of the switching state "raise pressure" is then determined with the help of the stored value. For the quickest possible restoration of a braking pressure level with optimal utilization of the available frictional value on the wheel located on the surface with the higher frictional value, it is furthermore possible to count the switching steps for the increase of the braking pressure taken before any time interval of braking pressure reduction, and to control the raising of the braking force after a time interval as a function of this number. A combination of these two possibilities is also advantageous.

The above described embodiments of the invention are intended to be illustrative only. Numerous alternative embodiments may be devised by those skilled in the art without departing from the spirit and scope of the following claims.

We claim:

1. A process for influencing, by a common braking value, the braking forces applied to wheels on opposite sides of an axle of a vehicle traveling on a road surface with different frictional values on the opposite sides of said vehicle, said process comprising the following steps:

a) measuring the rotational velocities of two wheels located on the opposite sides of the vehicle, as rotational velocity signals, b) evaluating the changes over time of said rotational velocity signals to determine whether a locking tendency is present on said wheels during braking of the vehicle, c) wherein when a locking tendency is ascertained on at least one of said wheels, said common braking value is influenced in such manner under a first regulating principle, that the wheel located on said road surface with the lower frictional value is locked at least intermittently, wherein d) under said first regulating principle, the braking forces are briefly reduced by influencing said common braking value during a predetermined time interval, to such an extent that said wheel located on said road surface with the lower frictional value is able to start up again from the locked state if said lower frictional value has increased.

2. The process as in claim 1, wherein under the first regulating principle, the braking forces are increased to such an extent through the influence of said common braking value outside said predetermined time interval, that said wheel located on said road surface with the greater frictional value has a locking tendency.

3. The process as in claim 1, wherein negative acceleration signals and slip signals of said wheel located on said road surface with the greater frictional value, and positive acceleration signals of said wheel located on said road surface with the lower frictional value, are taken into consideration under the first regulating principle to recognize the locking tendency.

4. The process as in claim 1, wherein under the first regulating process, a locking tendency is recognized if the mean value of said rotational velocity signals falls below a threshold value.

5. The process as in claim 4, wherein said threshold value is reduced in case of a very great or a very low vehicle deceleration.

6. The process as in claim 1, wherein during the transition to the first regulating principle, said common braking value is changed continuously, or in small steps, according to a time function.

7. The process as in claim 1, wherein the transition to the first regulating principle takes place only in case of vehicle decelerations below a predetermined limit value.

8. The process as in claim 1, wherein under the first regulating principle, and after a time interval during which the braking forces have been briefly reduced under the influence of said common braking value, said common braking value existing prior to said time interval is restored, at least approximately.

9. The process as in claim 1, wherein under the first regulating principle, when changes of said rotational velocity signal of said wheel located on said road surface with the greater frictional value occur in the form of regulating fluctuations, the phases of braking force reduction, occurring as a result of said changes of said rotational velocity signal, are used as time intervals of the first regulating principle.

10. The process as in claim 1, wherein:
   a) in addition to said first regulating principle, a second regulating principle is provided, wherein
   b) under said second regulating principle, said common braking value is influenced so that none of said wheels is locked when the highest possible braking forces are applied, and
   c) wherein when the rotational velocity signal of said wheel on said road surface with the lower frictional value rises, as a result of a reduction of said common braking value, at least approximately to the level of the rotational velocity signal of said wheel on said road surface with the higher frictional value, the second regulating principle is applied instead of the first regulating principle, and
   d) wherein when said rotational velocity signal of said wheel on said road surface with the lower frictional value does not rise to approximately the rotational velocity signal of said wheel on said road surface with the higher frictional value, travel is continued under the first regulating principle.

11. The process as in claim 10, wherein the principle of select low regulation is used as the second regulating principle.

12. The process as in claim 10, wherein the principle of modified axle regulation is used as the second regulating principle.

13. The process as in claim 10, further comprising the steps of:

a) evaluating the changes over time of said rotational velocity signals when braking the vehicle to determine a difference between the frictional values between said road surface and said wheels as a $\mu$-split-value, if none of said wheels are locked,
   b) wherein when a locking tendency is found on said wheels, and said $\mu$-split-value does not exceed a predetermined limit value, said common braking value is influenced to such an extent under an additional regulating principle, that none of said wheels are locked at the highest possible braking forces, and
   c) wherein when said $\mu$-split-value exceeds said predetermined limit value in the presence of a locking tendency, the first regulating principle is applied.

14. The process as in claim 13, wherein the principle of select low regulation is used as the additional regulating principle.

15. The process as in claim 13, wherein the principle of modified axle regulation is used as the additional regulating principle.

16. An apparatus for influencing, by a common braking value, the braking forces applied to wheels on opposite sides of an axle of a vehicle traveling on a road surface with different frictional values on opposite sides of said vehicle, comprising:
   a) a reservoir containing a pressure medium,
   b) a brake pedal actuated valve, receiving said pressure medium from said reservoir, for generating said braking forces to said wheels,
   c) a solenoid valve, connected in series with said brake pedal valve, for influencing said braking forces by means of said common braking value,
   d) a control unit connected to said solenoid valve, for controlling said common braking value via said solenoid valve,
   e) rotational velocity sensors associated with each of said wheels, wherein output signals from said rotational velocity sensors are inputted to said control unit,
   wherein when a locking tendency is ascertained by said control unit on at least one of said wheels, based on said input signals from said rotational velocity sensors, said control unit causes said solenoid valve to influence said common braking value, such that the wheel located on said road surface with the lower frictional value is locked at least intermittently, and
   wherein said braking forces are briefly reduced by influencing said common braking value during a predetermined time interval, to such an extent that said wheel located on said road surface with the lower frictional value is able to start up again from the locked state if said lower frictional value has increased.

* * * * *